United States Patent
Voss et al.

(10) Patent No.: US 12,508,546 B2
(45) Date of Patent: Dec. 30, 2025

(54) MEMBRANE SEPARATION UNIT, ARRANGEMENT OF MEMBRANE SEPARATION UNITS, AND MEMBRANE SEPARATION PROCESS

(71) Applicant: Linde GmbH, Pullach (DE)

(72) Inventors: Christian Voss, Pullach (DE); Rainer Hoffmann, Pullach (DE); Patrick Schiffmann, Pullach (DE); Matthias Johannink, Pullach (DE)

(73) Assignee: Linde GmbH, Pullach (DE)

( * ) Notice: Subject to any disclaimer, the term of this patent is extended or adjusted under 35 U.S.C. 154(b) by 814 days.

(21) Appl. No.: 17/594,173

(22) PCT Filed: Mar. 27, 2020

(86) PCT No.: PCT/EP2020/025149
§ 371 (c)(1),
(2) Date: Oct. 5, 2021

(87) PCT Pub. No.: WO2020/207625
PCT Pub. Date: Oct. 15, 2020

(65) Prior Publication Data
US 2022/0176319 A1    Jun. 9, 2022

(30) Foreign Application Priority Data
Apr. 8, 2019 (EP) .................... 19020270

(51) Int. Cl.
*B01D 61/12* (2006.01)
*B01D 53/22* (2006.01)
*B01D 65/10* (2006.01)

(52) U.S. Cl.
CPC .......... *B01D 61/12* (2013.01); *B01D 53/227* (2013.01); *B01D 65/10* (2013.01); *B01D 2053/221* (2013.01)

(58) Field of Classification Search
None
See application file for complete search history.

(56) References Cited

U.S. PATENT DOCUMENTS

| | | | |
|---|---|---|---|
| 2001/0003259 A1* | 6/2001 | Dolle | B01D 53/227 95/45 |
| 2005/0230856 A1* | 10/2005 | Parekh | C10J 1/08 261/122.1 |

(Continued)

FOREIGN PATENT DOCUMENTS

| | | |
|---|---|---|
| DE | 102010003507 A1 | 10/2011 |
| EP | 0778069 A1 | 6/1997 |
| WO | 2018069318 A1 | 4/2018 |

OTHER PUBLICATIONS

Stookey, D.J., "Membranes: Gas-Separation Applications", Ullmann's Encyclopedia of Industrial Chemistry, Wiley-VCH, online publication 2005, DOI 10.1002/14356007.a16_187.pub2.

*Primary Examiner* — Richard C Gurtowski
(74) *Attorney, Agent, or Firm* — Millen, White, Zelano & Branigan, P.C.; Brion P. Heaney

(57) ABSTRACT

A membrane separation unit wherein the membrane separation unit has a pressure vessel and a membrane provided inside the pressure vessel in a membrane arrangement, and wherein the pressure vessel has an inlet nozzle for a feed gas mixture, an outlet nozzle for a permeate and an outlet nozzle for a retentate. The membrane separation unit has in this case measurement means that are arranged at least partially inside the pressure vessel and/or inside the inlet nozzle for the feed gas mixture and/or inside the outlet nozzle for the permeate and/or inside the outlet nozzle for the retentate and are set up to record one or more parameters relevant to operation.

13 Claims, 2 Drawing Sheets

(56) References Cited

U.S. PATENT DOCUMENTS

2014/0360365 A1* 12/2014 Wynn .................... B01D 53/22
  95/45
2016/0046503 A1*  2/2016 Hoek ..................... B01D 61/12
  210/741
2019/0232230 A1*  8/2019 Richter ................. F04B 43/043

* cited by examiner

MEMBRANE SEPARATION UNIT, ARRANGEMENT OF MEMBRANE SEPARATION UNITS, AND MEMBRANE SEPARATION PROCESS

The present invention relates to a membrane separation unit, an arrangement having a plurality of such membrane separation units, and a membrane separation process carried out using one or more corresponding membrane separation units or a corresponding arrangement.

PRIOR ART

Membrane separation processes for processing gas mixtures are known and are described, for example, in Stookey, D. J., Membranes: Gas-Separation Applications, Ullmann's Encyclopedia of Industrial Chemistry, Wiley-VCH, online publication 2005, DOI 10.1002/14356007.a16_187.pub2. With regard to the membrane materials used for this and the gas mixtures separable by means of membrane separation processes, reference is expressly made to the technical literature. The present invention can in principle be used in conjunction with all such membrane materials and membrane separation processes.

Membrane separation processes are based on the different permeability and, where applicable, affinity of a membrane material to different components of a gas mixture. In a membrane separation process, the gas mixture is provided on a first side of a corresponding membrane (retentate side), and a pressure gradient is generated across the membrane. Components to which the membrane has a higher permeability preferably pass through the membrane and can be discharged on the second side (permeate side), optionally using a purge gas. Components to which the membrane has a lower permeability, on the other hand, preferably remain on the retentate side and can be discharged from there. The term "retentate" is used below for a gas or gas mixture discharged on the retentate side, and the term "permeate" is used for a gas or gas mixture discharged on the permeate side.

As also described in the cited literature, membrane cartridges are typically used in corresponding membrane separation processes, in which, for example, membrane stacks arranged perpendicularly to the longitudinal axis or spirally wound membranes are formed in order to increase the contact area with the membrane. Hollow fiber bundles formed from suitable materials can also be used. A purge gas can be conducted on the permeate side. One or more membrane cartridges typically comprise a module (in a pressure housing) and can be combined into assemblies (banks or skids).

The membrane cartridges explained, hereinafter also referred to as "membrane separation units" for reasons of generality, are components of complex construction and at the same time are not as robust as desired. In order to prevent damage to the membrane separation units, they must always be operated within the design limits or under the specified operating conditions, for example with respect to the pressure gradient used across the membrane, in order to avoid failures and damage.

The object of the present invention is to specify means which make it possible to ensure or document an operation of a membrane separation unit conforming to specifications and to quickly and reliably detect any damage to a membrane separation unit.

DISCLOSURE OF THE INVENTION

Against this background, the present invention proposes a membrane separation unit, an arrangement comprising a plurality of such membrane separation units, and a membrane separation process carried out using one or more such membrane separation units or a corresponding arrangement, having the features of the respective independent claims. Embodiments of the present invention form the subject matter of the dependent claims and the following description.

By means of local operating parameter detection on a membrane separation unit, the present invention enables simple and reliable monitoring and recording of the exceeding of operating limits, which can be carried out independently of the process control system (PCS or distributed control system, DCS) used in each case. In the event of damage, the use of the present invention thus makes it easier to clarify whether or not a defect has been caused by an improper operating mode.

In particular, the present invention enables rapid and reliable detection of membrane damage on the basis of a reduction in the permeate outlet temperature. As a result, not all membrane cartridges of an assembly have to be removed and tested in the event of damage, but only those to which the damage can be attributed. This can substantially reduce the downtime of a membrane system or allow continuous operation to be maintained.

Pressure and temperature of the feed stream and of the retentate and permeate stream to or from a membrane system have previously at most been stored in the process control system in the form of a time series for an entire assembly consisting of a plurality of membrane separation units. The concentrations of individual target components are, where appropriate, measured in the relevant product stream and likewise stored as a time series. The complete composition of the individual streams to and from the membrane separation unit or a corresponding assembly, in particular certain components such as heavier hydrocarbons, is typically not measured and documented, or only sporadically.

However, in order to document that a membrane separation unit were operated within the specified operating conditions, any violation of these conditions (e.g., exceeding pressure gradients) should be indicated and recorded, as was recognized in the context of the present invention. This should be done locally on the membrane separation unit so that it is easily available, for example, in the event of warranty claim.

The surface temperatures at the permeate outlet nozzles of the membrane separation units are conventionally measured regularly by hand or by means of an infrared measuring device in order to identify differences between the different modules and thus any defective membranes. Different ambient conditions (external temperature, sunshine, etc.) make it difficult to interpret the absolute temperature measured at the outlet nozzle, let alone the measurement errors of a measurement with a hand-held device such as an infrared thermometer.

As has been recognized according to the invention, the permeate composition and the permeate temperature are suitable for the identification of defective membrane separation units. Defective membranes cause more gas to be expanded to the low-pressure side, as a result of which the gas cools more. However, the permeate temperature in the individual pressure tubes cannot be measured directly by conventional means. Conventionally, a conclusion can be drawn regarding the permeate temperature of an individual pressure pipe relative to the permeate temperature of the other pressure pipes only via a measurement of the external temperature of the permeate outlet nozzle (by hand or by means of an infrared measuring device).

Against this background, the present invention proposes a membrane separation unit for a membrane separation process for separating a gas mixture. The membrane separation unit is in principle designed as explained in the introduction. It therefore has a pressure vessel and a membrane provided inside the pressure vessel in a membrane arrangement. The membrane arrangement can be provided in the manner explained in the introduction, for example in the form of a membrane stack, a spirally wound membrane, or a hollow fiber membrane. Reference is made to the cited technical literature for further details. The present invention can in principle be used with all membrane materials known from the prior art. In order to avoid repeating what is already known, more detailed explanations are omitted.

As is customary in this respect for corresponding membrane separation units (membrane cartridges), the pressure vessel has an inlet nozzle for a feed gas mixture, an outlet nozzle for a permeate and an outlet nozzle for a retentate. A plurality of corresponding inlet or outlet nozzles can also be present. In particular, an inlet nozzle for a purge gas can additionally also be provided in a membrane separation unit used within the scope of the present invention. However, this is not a prerequisite.

The membrane separation unit proposed according to the invention is now characterized by measurement means that are arranged at least partially inside the pressure vessel and/or inside the inlet nozzle for the feed gas mixture and/or inside the outlet nozzle for the permeate and/or inside the outlet nozzle for the retentate and are set up to record one or more parameters relevant to operation.

As explained at the outset, only the pressure and temperature of a feed stream and of the retentate and permeate stream to and from an entire membrane system are conventionally monitored, and, in addition, only specific parameters are detected in each case. In contrast, in the context of the present invention, it is now provided to measure process conditions, in particular process conditions relevant to warranty, in particular pressures such as a transmembrane pressure, temperatures, or the concentration of components particularly relevant to the membrane performance, locally at a corresponding membrane cartridge or at the aforementioned locations. The measurement means used in the context of the present invention can be sensor units or pick-ups or transducers known per se for corresponding parameters. These can be configured for transmission of corresponding sensor values, for example by wired or wireless (remote) transmission. Within the scope of the present invention, all types of sensors can be used, for example analog or digital sensors or so-called smart sensors, which already carry out a certain evaluation of a corresponding measurement signal.

In particular, in the context of the present invention, a corresponding membrane separation unit can be equipped with a documentation unit which is attached inside the pressure vessel or permanently connected to the pressure vessel and which is designed to evaluate and/or store the one or more parameters relevant to operation. The documentation unit is thus also provided locally on the corresponding membrane separation unit and is in particular designed to record local parameters. This of course does not preclude the fact that a corresponding membrane separation unit can be integrated into a higher-level arrangement, in particular of a plurality of membrane separation units, inside which further evaluation and documentation units, for example central process control systems, can then be present. Reference is expressly made at this point to the explanations made below with regard to an arrangement provided according to the invention.

The measurement means used within the scope of the present invention can be provided in particular in the form of one or more encapsulated sensors, which have their own power supply and can in particular be permanently installed on the pressure vessel. In this way, these sensors or measurement means are similar to the known temperature stickers. Corresponding sensors can also have a local display, in particular in the form of a point that changes color, or a remote transmission device, as explained below, so that corresponding data can be read out quickly and without problems. The same also applies to the evaluation and documentation unit provided according to the invention.

In addition to pressures and temperatures already explicitly mentioned above, corresponding measurement means can also be designed to detect certain components, in particular in the permeate or retentate, but also in the feed gas mixture where applicable. Spectroscopic gas sensors, for example, can be used as corresponding measurement means. Since corresponding devices can only process non-pressurized analysis streams, it can be provided in this case to withdraw and relax a portion of the respective analysis stream from the respective main stream (the feed gas mixture, the retentate stream or the permeate stream). After a suitably performed analysis, a corresponding analysis stream can be fed back to the main stream.

An essential aspect of the present invention consists in the provision of a membrane separation unit in which the documentation unit already explained is set up for providing, evaluating and/or storing a time profile of the one or more parameters relevant to operation. In this way, for example, measurement events can be detected such as the exceeding of pressure gradients, i.e., the change in pressure over time, or the exceeding or falling below temperature limits or maximally allowed gradients. Corresponding parameters relevant to operation can in each case be recorded with a time stamp in a local storage unit. All of the previously explained parameters relevant to operation can be stored for evaluation in a possible warranty case. In this way, it can be reliably determined whether any damage to a corresponding membrane separation unit is attributable to production errors or to operation not conforming to specifications.

In a membrane separation unit according to the invention, the documentation unit is advantageously designed to detect operation not conforming to specifications on the basis of the one or more parameters relevant to operation and/or one or more features of the time profile of such parameters. An example of a corresponding evaluation has already been explained with reference to temperature gradients or pressure gradients. If a slope of a corresponding gradient is above a predetermined maximum value, it can be assumed that a corresponding membrane separation unit has not been operated conforming to specifications, and any possible damage is therefore attributable to such an operation not confirming to specifications.

In other words, the documentation unit can be designed to detect operation not conforming to specifications on the basis of the one or more parameters relevant to operation and/or one or more features of the time profile. In the context of the present invention, the documentation unit of the membrane separation unit provided according to the invention can, in particular, have a remotely readable storage device. In this way, it is easily possible for an operator of a corresponding system to read out and acquire corresponding parameters without having to establish a wired connection to the corresponding documentation units in each case or carry out a local pressure or temperature measurement. A corresponding remotely readable storage device can be configured, in particular, for a radio transmission of the corresponding measurement data or the parameters relevant to operation or values derived therefrom, such as time profiles. RFID chips are particularly suitable here for a corresponding data transmission, in which case corresponding remotely readable storage devices can be prompted to emit corresponding data in particular by an externally applied signal.

As already explained, the measurement means used in a membrane separation unit according to one embodiment of the present invention can, in particular, comprise a pressure transducer, and the one or more parameters relevant to operation can comprise at least one pressure value. The at least one pressure transducer is arranged, in particular, on a permeate side and/or a retentate side of the membrane arrangement inside the pressure vessel. Two corresponding pressure transducers that are provided on both sides of the membrane arrangement are particularly suitable for recording a transmembrane pressure in this way. In this way, and by a corresponding recording of pressure gradients, it can be documented whether a corresponding operating specification for the membrane separation unit has been complied with.

The measurement means further comprise, in particular, at least one temperature transducer, additionally or alternatively to the one or more pressure transducers and corresponding other measurement means, in which case the one or more parameters relevant to operation can comprise one or more temperature values. In the context of the present invention, it has been found to be particularly advantageous in this connection to detect a temperature inside the outlet nozzle for the permeate. In contrast to conventionally used measuring methods, a temperature measurement inside the outlet nozzle allows a direct temperature measurement with respect to the permeate, which cannot be distorted by external influences, for example solar irradiation onto the permeate outlet nozzle. In particular, in an arrangement having a plurality of membrane separation units, all the permeate outlet nozzles can be provided with a corresponding temperature measurement. This is also explained in more detail below with reference to the arrangement provided according to the invention. In particular, membrane damage can be detected by a corresponding temperature measurement, since, as mentioned, in this case, a larger amount of (cold) gas passes through the membrane and the temperature at the permeate outlet nozzle therefore decreases.

As mentioned, corresponding measurement means can also be set up in the context of the present invention in particular for detecting a concentration of at least one component in the feed gas mixture, in the permeate and/or in the retentate.

As already mentioned several times, the present invention furthermore extends to an arrangement for separating a gas mixture by means of a membrane separation process. The arrangement provided according to the invention is characterized by a plurality of membrane separation units, as previously explained in different embodiments. Reference is therefore explicitly made to the embodiments above. The arrangement does not have to be constructed from identical membrane separation units each with identical equipment; rather, it can also be a plurality of different membrane separation units, and it can also be provided in certain cases to combine membrane separation units according to the invention and membrane separation units not according to the invention, if this appears expedient.

In particular, the arrangement provided according to the invention has a central evaluation unit which is designed to subject the one or more parameters relevant to operation that have been recorded by means of the measurement means of the plurality of membrane separation units to a comparative evaluation. This is explained below in particular with reference to temperatures of a temperature measurement, but can also be carried out in a corresponding manner for other parameters relevant to operation.

In particular, in the context of the present invention, the comparative evaluation comprises an outlier determination. As mentioned, the outlier determination can relate in particular to a plurality of temperatures determined by means of the measurement means of the plurality of membrane separation units. In this way, a reliable detection of membrane damage is made possible, which in particular cannot be distorted by external temperature influences.

In order to reliably detect membrane damage, it is proposed to equip all the permeate outlet nozzles, or at least a portion thereof, with an in particular wireless surface temperature measurement (in particular using RFID chips). Corresponding measurement results can be read out and recorded regularly in the central evaluation unit provided according to the invention, for example in a reading device. If it can be assumed that all the permeate outlet nozzles have the same ambient conditions (temperature, sunshine) at each measurement time, it is sufficient to detect outliers at the respective measurement time. All flanges or nozzles that have a temperature that is less than a certain predetermined threshold value (e.g., 10° C.) relative to the median of all measured data indicate a defective membrane. If an outlet nozzle is constantly recognized as exceeding the detection threshold over a certain period of time (for example, 24 hours), a message can be sent to a central process control system or directly to the manufacturer, whereupon the corresponding membrane separation unit or the membrane thereof must be exchanged. In this way, a reliable detection of defective membrane separation units is made possible.

The present invention further extends to a process for separating a gas mixture by means of a membrane separation process, this process being characterized in that one or more membrane separation units are used as previously explained, or a corresponding arrangement is used. Since the process proposed according to the invention also benefits from the features explained above, reference is expressly made to these again. In particular, the one or more parameters relevant to operation can be detected in the process proposed according to the invention.

The present invention is explained in more detail hereafter with reference to the accompanying drawings, which illustrate embodiments of the present invention.

In the figures explained below, identical components are provided with identical reference signs and are not explained repeatedly for the sake of clarity. This also applies to components of different design but fulfilling the same purpose.

DETAILED DESCRIPTION OF THE DRAWINGS

Figure 1:
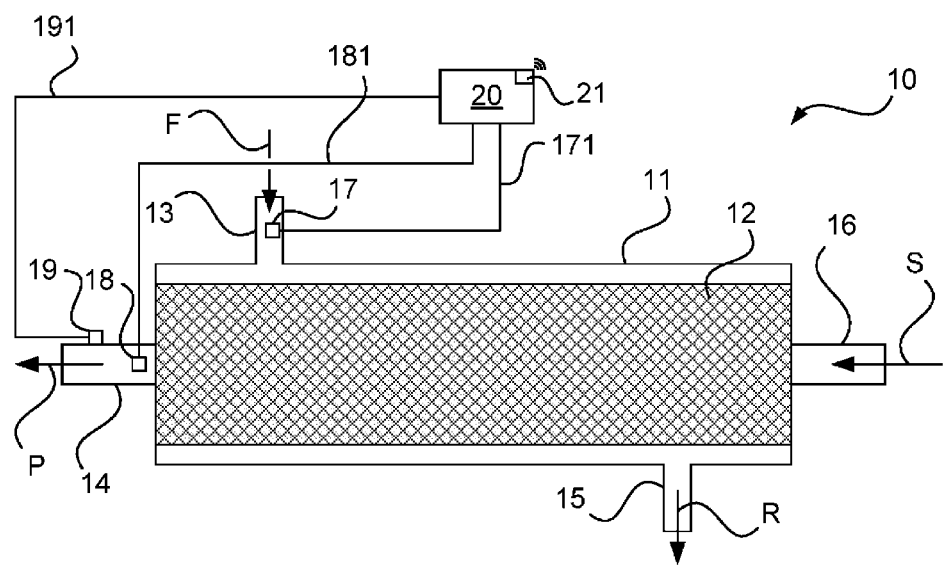
FIG. 1 illustrates a membrane separation unit according to an embodiment of the present invention.

FIG. 1 illustrates, in a highly simplified schematic way, a membrane separation unit according to a particularly preferred embodiment of the present invention, which is designated as a whole by 10.

The membrane separation unit 10 shown in FIG. 1 comprises a pressure vessel 11 which encloses a pressurizable internal space. A membrane arrangement 12 is provided in the internal space and thus inside the pressure vessel 11, which membrane arrangement can be designed in different ways, as explained above.

An inlet nozzle 13 for a feed gas mixture (feed) F is provided for charging the membrane separation unit 10 with the corresponding feed gas mixture F. Furthermore, the membrane separation unit 10 has an outlet nozzle 14 for a permeate P and an outlet nozzle 15 for a retentate R. FIG. 1 additionally illustrates an inlet nozzle 16 for a purge gas S, which does not necessarily have to be present.

In the embodiment of the present invention illustrated in FIG. 1, measurement means 17, 18 in the form of corresponding sensors are provided inside the inlet nozzle 13 in the pressure vessel 11 and inside the outlet nozzle 14 for the permeate P, respectively. Another measurement means 19 in the form of a corresponding sensor is provided at the outlet nozzle 14 for the permeate P.

The measurement means 17 and 18 illustrated here are pressure sensors for detecting a transmembrane pressure or respective pressure values on both sides of the membrane arrangement 12, whereas the measurement means 19 can in particular be designed as a temperature sensor. In a corresponding membrane separation unit 10, not all of the measurement means shown need to be present and additional measurement means can be present, which can be arranged at any different locations.

Said measurement means 17, 18, 19 are connected via wireless or wired communication links 171, 181 and 191 to a documentation unit 20 which is designed to evaluate and/or store the parameters relevant to operation acquired via the measurement means 17, 18 and 19. In this case, the documentation unit 20 is attached, in particular, to the pressure vessel 11 or inside the pressure vessel 11 and permanently connected thereto. With regard to the functionality of the membrane separation unit 10 shown in FIG. 1, reference is expressly made to the above explanations. The documentation unit 20 comprises, in particular, a data remote transmission module 21 or a remotely readable storage device 21.

Figure 2:
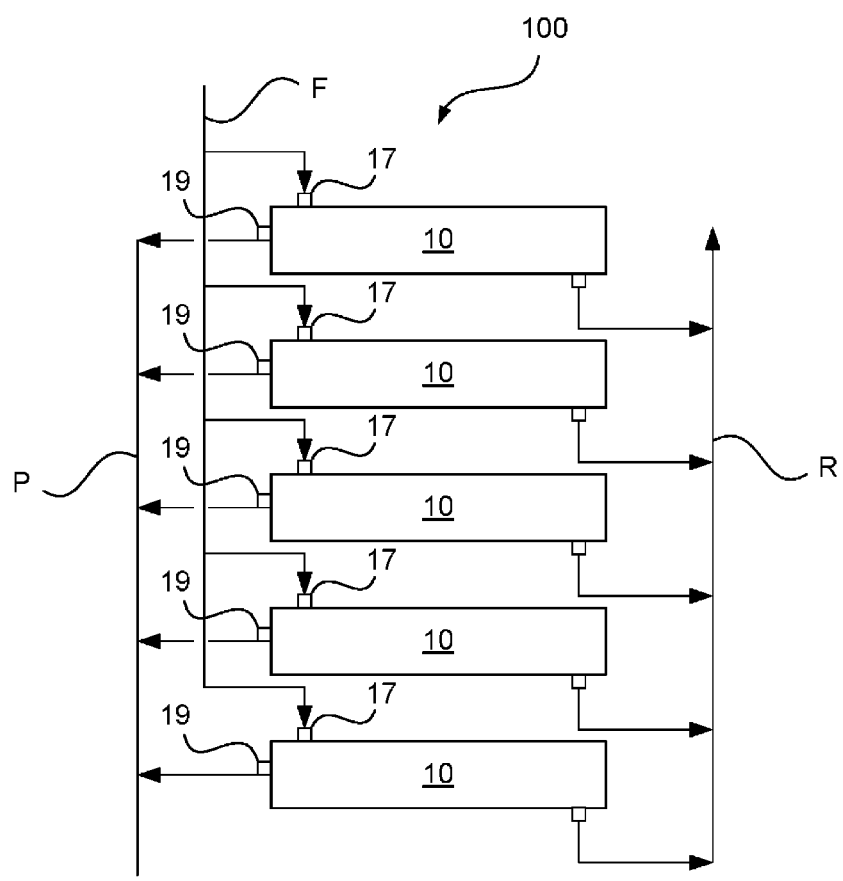
FIG. 2 illustrates an arrangement of membrane separation units according to an embodiment of the present invention.

FIG. 2 shows an arrangement of a plurality of membrane separation units 10, in this case of identical design, which are designed according to an embodiment of the invention and have already been explained with respect to FIG. 1, the arrangement being designated as a whole by 100.

A feed gas stream F is distributed between the membrane separation units 10 and fed into the membrane separation units 10 via the inlet nozzles 13 not illustrated separately here. Accordingly, a permeate stream is respectively extracted from the membrane separation units 10 via the removal nozzles for permeate, not illustrated separately here, and combined to form a permeate collection stream P. The same applies to a retentate collection stream R, which is formed from retentate removed via the removal nozzles 15.

Furthermore, a measurement means 19 is illustrated in each case at the permeate outlet nozzles in the arrangement 100 according to FIG. 2, which measurement means is designed here as a temperature sensor. By means of a central evaluation unit 30, temperature values can be detected centrally and subjected to a comparative evaluation, as already explained above. The same applies to values of the measurement means 17 and (not shown) 18.

The invention claimed is:

1. A membrane separation unit for a membrane separation process for separating a gas mixture, the membrane separation unit comprising:
    a pressure vessel and a membrane provided inside the pressure vessel in a membrane arrangement, wherein the pressure vessel has an inlet nozzle for a feed gas mixture, an outlet nozzle for a permeate, and an outlet nozzle for a retentate,
    measurement means arranged at least partially inside the pressure vessel and/or inside the inlet nozzle for the feed gas mixture and/or inside the outlet nozzle for the permeate and/or inside the outlet nozzle for the retentate, wherein said measurement means are set up to record one or more parameters relevant to operation, wherein the measurement means comprise at least one temperature transducer arranged inside the outlet nozzle for the permeate from the pressure vessel, and wherein the one or more parameters relevant to operation comprise a temperature value and
    a documentation unit attached inside the pressure vessel or permanently connected thereto, wherein said documentation unit is designed to evaluate and/or store the one or more parameters relevant to operation,
    wherein the documentation unit is designed to provide, evaluate and/or store a time profile of the one or more parameters relevant to operation, and wherein the documentation unit is designed to detect operation not conforming to specifications on the basis of the one or more parameters relevant to operation and/or one or more features of the time profile.

2. The membrane separation unit according to claim 1, wherein the documentation unit has a remotely readable storage device.

3. The membrane separation unit according to claim 1, wherein the measurement means comprise at least one pressure transducer, and wherein the one or more parameters relevant to operation comprise a pressure value.

4. The membrane separation unit according to claim 3, wherein the at least one pressure transducer is arranged on a permeate side and/or a retentate side of the membrane arrangement inside the pressure vessel and/or inside the inlet nozzle for the feed gas mixture and/or inside the outlet nozzle for the permeate and/or inside the outlet nozzle for the retentate.

5. An arrangement for separating a gas mixture by means of a membrane separation process, wherein said arrangement includes a plurality of membrane separation units according to claim 1.

6. The arrangement according to claim 5, having a central evaluation unit which is configured to subject the one or more parameters relevant to operation that have been recorded by means of the measurement means of the plurality of membrane separation units to a comparative evaluation.

7. The arrangement according to claim 6, wherein the comparative evaluation comprises an outlier determination.

8. The arrangement according to claim 7, wherein the outlier determination relates to a plurality of temperatures determined by means of the measurement means of the plurality of membrane separation units.

9. A process for separating a gas mixture by means of a membrane separation process, comprising:

introducing a gaseous feedstock, wherein the gaseous feedstock is a gas mixture, into one or more membrane separation units in which the gas mixture is separated, wherein one or more membrane separation units each comprise:

a pressure vessel and a membrane provided inside the pressure vessel in a membrane arrangement, wherein the pressure vessel has an inlet nozzle for introducing the gaseous feedstock, an outlet nozzle for a permeate, and an outlet nozzle for a retentate, measurement means arranged at least partially inside the pressure vessel and/or inside the inlet nozzle and/or inside the outlet nozzle for the permeate and/or inside the outlet nozzle for the retentate, wherein said measurement means are set up to record one or more parameters relevant to operation, and a documentation unit attached inside the pressure vessel or permanently connected thereto, wherein said documentation unit is designed to evaluate and/or store the one or more parameters relevant to operation, wherein the documentation unit is designed to provide, evaluate and/or store a time profile of the one or more parameters relevant to operation, and wherein the documentation unit is designed to detect operation not conforming to specifications on the basis of the one or more parameters relevant to operation and/or one or more features of the time profile.

10. The process according to claim 9, wherein the one or more parameters relevant to operation are detected by means of the measurement means.

11. A membrane separation unit for a membrane separation process for separating a gas mixture, the membrane separation unit comprising:

a pressure vessel and a membrane provided inside the pressure vessel in a membrane arrangement, wherein the pressure vessel has an inlet nozzle for a feed gas mixture, an outlet nozzle for a permeate, and an outlet nozzle for a retentate, measurement means arranged at least partially inside the pressure vessel and/or inside the inlet nozzle for the feed gas mixture and/or inside the outlet nozzle for the permeate and/or inside the outlet nozzle for the retentate, wherein said measurement means are set up to record one or more parameters relevant to operation, and a documentation unit attached inside the pressure vessel or permanently connected thereto, wherein said documentation unit is designed to evaluate and/or store the one or more parameters relevant to operation, wherein the documentation unit is designed to provide, evaluate and/or store a time profile of the one or more parameters relevant to operation, and wherein the documentation unit is designed to detect operation not conforming to specifications on the basis of the one or more parameters relevant to operation and/or one or more features of the time profile, and, wherein said membrane comprises hollow fiber bundles, a membrane cartridge in which membrane stacks are arranged, or a membrane cartridge in which spirally wound membranes are formed.

12. The membrane separation unit according to claim 1, wherein the documentation unit is capable of evaluating whether a pressure gradient limit is exceeded, whether a temperature exceed or fall below a temperature limit, or whether a temperature gradient limit is exceeded.

13. A membrane separation unit for a membrane separation process for separating a gas mixture, the membrane separation unit comprising:

a pressure vessel and a membrane provided inside the pressure vessel in a membrane arrangement, wherein the pressure vessel has an inlet nozzle for a feed gas mixture, an outlet nozzle for a permeate, and an outlet nozzle for a retentate, wherein in the membrane arrangement the membrane has a retenate side and a permeate side and the membrane provides separation of a gas mixture provided on a retenate side in that components of the gas mixture to which the membrane has a higher permeability pass through the membrane to the permeate side whereas components of the gas mixture to which the membrane has a lower permeability remain on the retentate side, measurement means arranged at least partially inside the pressure vessel and/or inside the inlet nozzle for the feed gas mixture and/or inside the outlet nozzle for the permeate and/or inside the outlet nozzle for the retentate, wherein said measurement means are set up to record one or more parameters relevant to operation, wherein the measurement means comprise at least one temperature transducer arranged inside the outlet nozzle for the permeate from the pressure vessel, and wherein the one or more parameters relevant to operation comprise a temperature value, and a documentation unit attached inside the pressure vessel or permanently connected thereto, wherein said documentation unit is designed to evaluate and/or store the one or more parameters relevant to operation, wherein the documentation unit is designed to provide, evaluate and/or store a time profile of the one or more parameters relevant to operation, and wherein the documentation unit is designed to detect operation not conforming to specifications on the basis of the one or more parameters relevant to operation and/or one or more features of the time profile.

* * * * *